Fig. 2.ª

C. G. LOHAY.
ELECTRICAL CONTROLLING MECHANISM.
APPLICATION FILED APR. 10, 1911.

1,031,457.

Patented July 2, 1912.

C. G. LOHAY.
ELECTRICAL CONTROLLING MECHANISM.
APPLICATION FILED APR. 10, 1911.

1,031,457.

Patented July 2, 1912.

UNITED STATES PATENT OFFICE.

CHARLES GEORGES LOHAY, OF PARIS, FRANCE.

ELECTRICAL CONTROLLING MECHANISM.

1,031,457.  Specification of Letters Patent.  Patented July 2, 1912.

Application filed April 10, 1911. Serial No. 620,203.

*To all whom it may concern:*

Be it known that I, CHARLES GEORGES LOHAY, citizen of the Republic of France, residing at 42 Rue d'Anjou, Paris, France, have invented certain new and useful Improvements in and Relating to Electrical Controlling Mechanism, of which the following is a specification.

The present invention is an improvement in apparatus for enabling an operator at a central or transmitting station to control at a distance one or more mechanisms, such as the back-sights of ordnance, and to control the exact execution of such operations at the central station.

The invention is an improvement on the device described and illustrated in British Patent No. 14,431 of 1908, and one of the objects of the invention is to provide an improved construction of interrupter at the central or transmitting station.

The invention will be more fully understood by reference to the accompanying drawings, wherein, Figure 1 of the accompanying drawing is a diagram of the installation of the transmitting station and of a receiving station.

Figure 1:
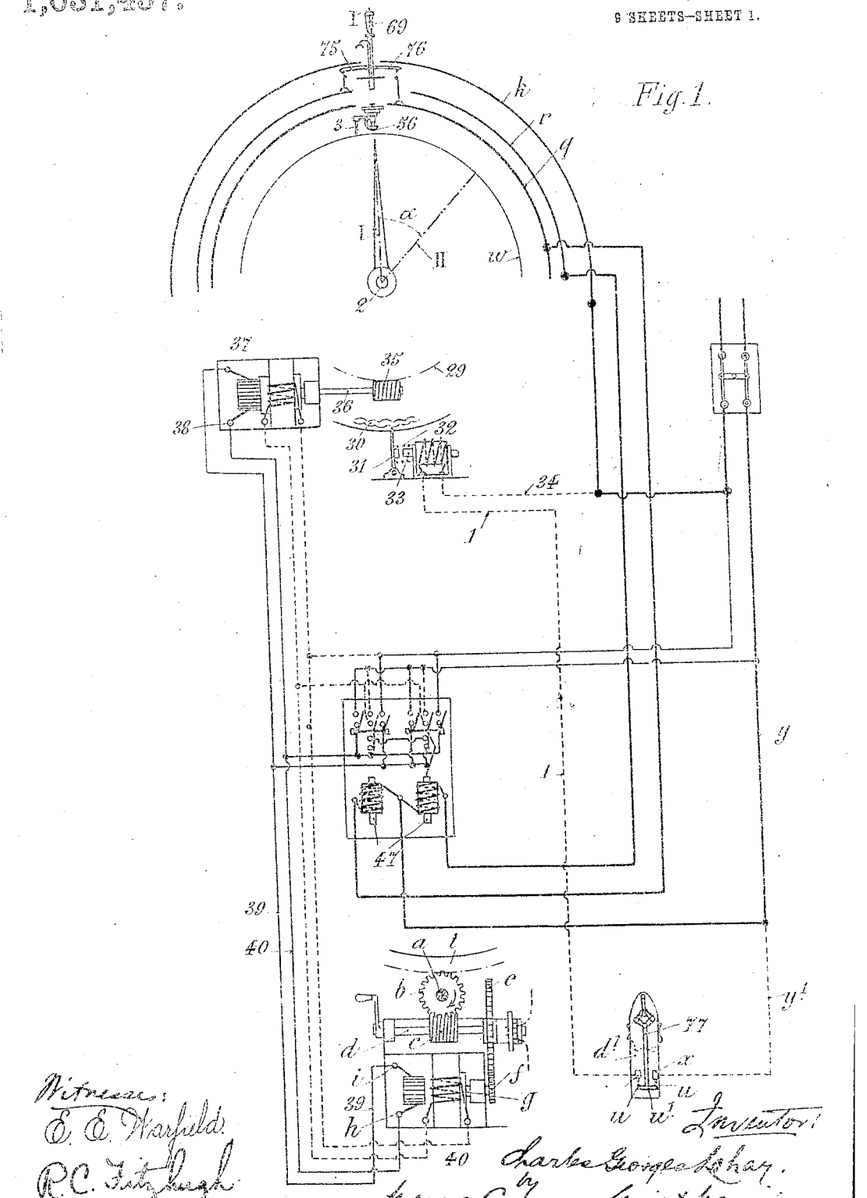
Figure 9:
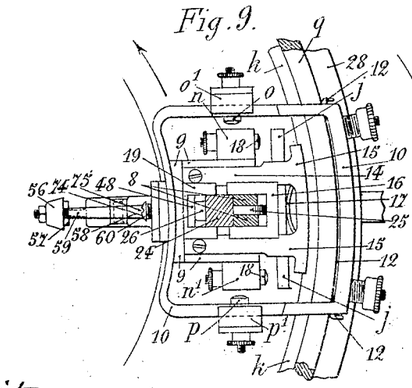

Referring to the drawings, and particularly to Fig. 1, *a* is a shaft at a receiving station which is connected to a mechanism which is operable electrically from a transmitting station, where an indicator is located. At the receiving station the installation comprises a mechanical transmission, such as a toothed wheel *b*, keyed upon the shaft *a* and meshing, for example, with an endless screw *c*, the latter being mounted on shaft *d*, as does gear *e* which meshes with pinion *f* mounted on shaft *g* of a motor having terminals *h* and *i*. For operating this motor, the transmitting station is provided with a switch or interrupter (hereafter more fully described) capable of receiving current by contact with a ring *k* connected with a suitable source of electricity. This interrupter is arranged in such a manner that after having come into contact with the ring *k* connected with the source of electricity, contacts *n* and *n'* (see Fig. 9) carried by it may be brought onto contacts *o* and *p*, respectively, the latter being connected, respectively, to rings *q* and *r*, which are in turn connected with the motor terminals *h*—*i*, either directly or through the intermediary of any suitable reversers 47, so that, according as the contact *o* or the contact *p* is engaged, the motor at the receiving station is driven in one direction or in the opposite direction. The motors at the transmitting and receiving stations are connected by conductors 39 and 40. The interrupter is movable over an indicating dial *w*, and the position into which it is brought on this dial exactly limits the angle through which the mechanism to be controlled is turned. The rotation of the motor in a given direction results in a corresponding rotation of the shaft *a*.

Figure 3:
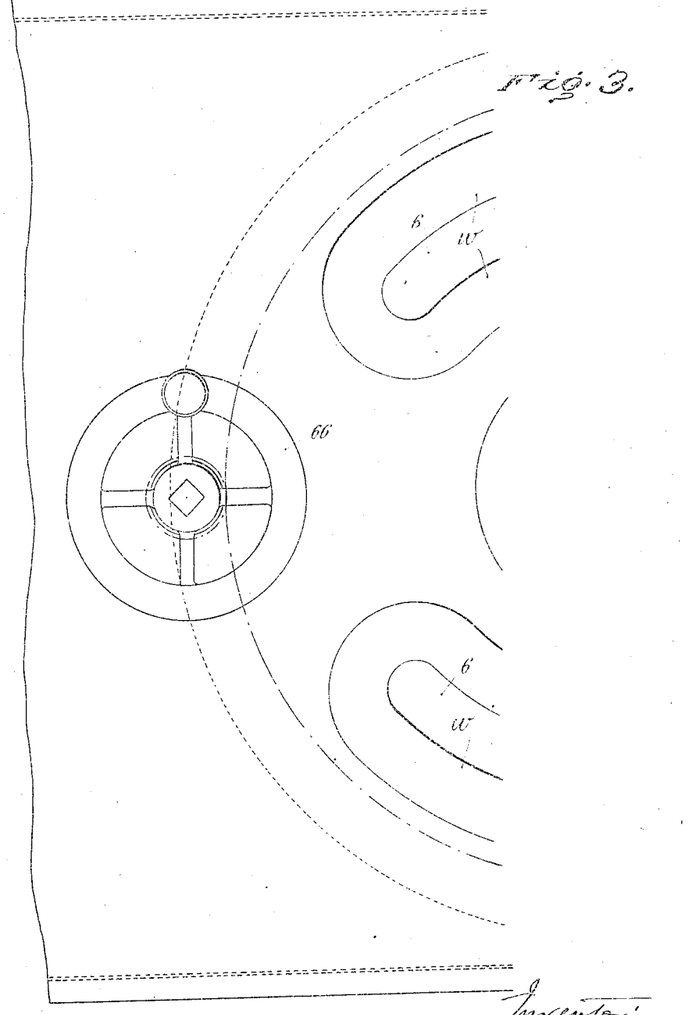
Figs. 3 and 3ª are together a plan corresponding to Fig. 2 with partial section along the axis of one of the interrupters.
Figure 3A:
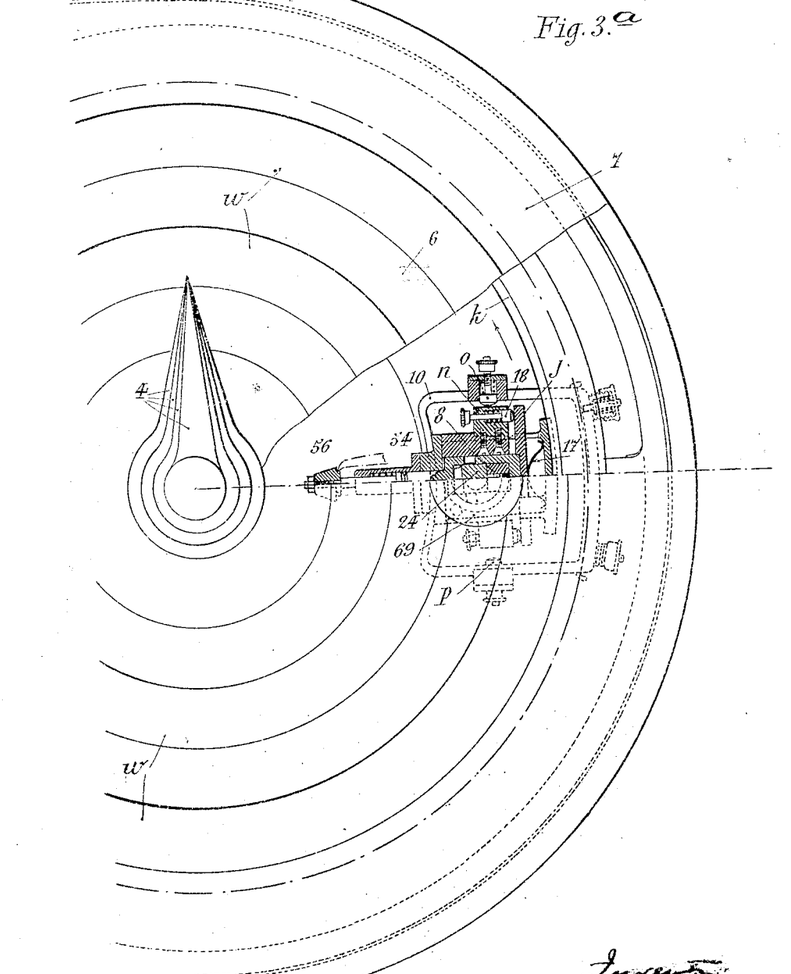
Figure 4:
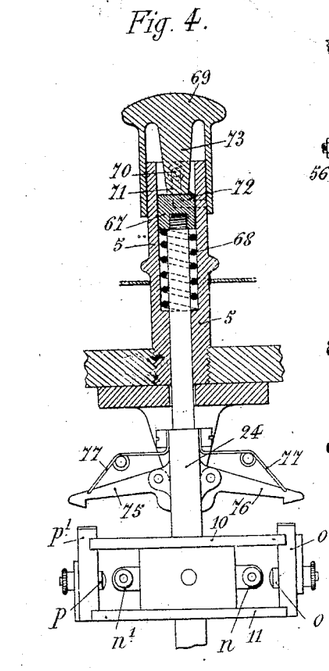
Fig. 4 is a detail sectional elevation on the line A A in Fig. 2 showing the parts of the interrupter and the engaging pawls 75, 76 in the normal inoperative position.

In the novel interrupter device the movement of the interrupter as a whole opposite the divisions of the graduated dial *w* and the operation of the rod 24 for placing in circuit or out of circuit are effected by separate parts. With this object the member for actuating the rod comprises a socket 5 guided in a circular groove 6 (Fig. 3) concentric with the shaft 2 which carries the tell-tale hand 4 and formed in the frame 7 which carries the graduated dial *w*. The socket 5 is rigid with a bar or stay 8. This bar passes inside the various interrupters of the installation. Each of these interrupters comprises an insulating frame 9 upon which there are fixed the two terminals n, n' intended to come into contact with the contact pieces o and p respectively. These contact pieces are carried by insulating stays o' p' connecting the conducting frames 10, 11 which bear respectively upon the conducting rings q and r by means of the flexible strips 12 and 13. The contact piece o is electrically connected with the frame 10 and the contact piece p with the frame 11.

The insulating frame 9 bears upon the lower branches of the conducting frames 10 and 11; it also carries a conducting bridge 14, 15, 14 in the branches 14 of which a conducting bar j fixed upon an insulating bracket 16 is able to slide. A spring 17 fixed beneath the arch 15 of the bridge constantly tends to depress the bar j and to bring its ends into contact with the projections 18 on the contact pieces n and n'. The bracket 16 is able to slide between the branches 14 of the bridge while the bar j slides inside the latter which are suitably recessed for this purpose. A U-shaped insulating part 19 is able to slide between the branches 14 of the bridge; an insulating tail-piece 20 projecting beneath the base of the U piece passes through a hole formed in the insulating frame 9.

Figure 2:
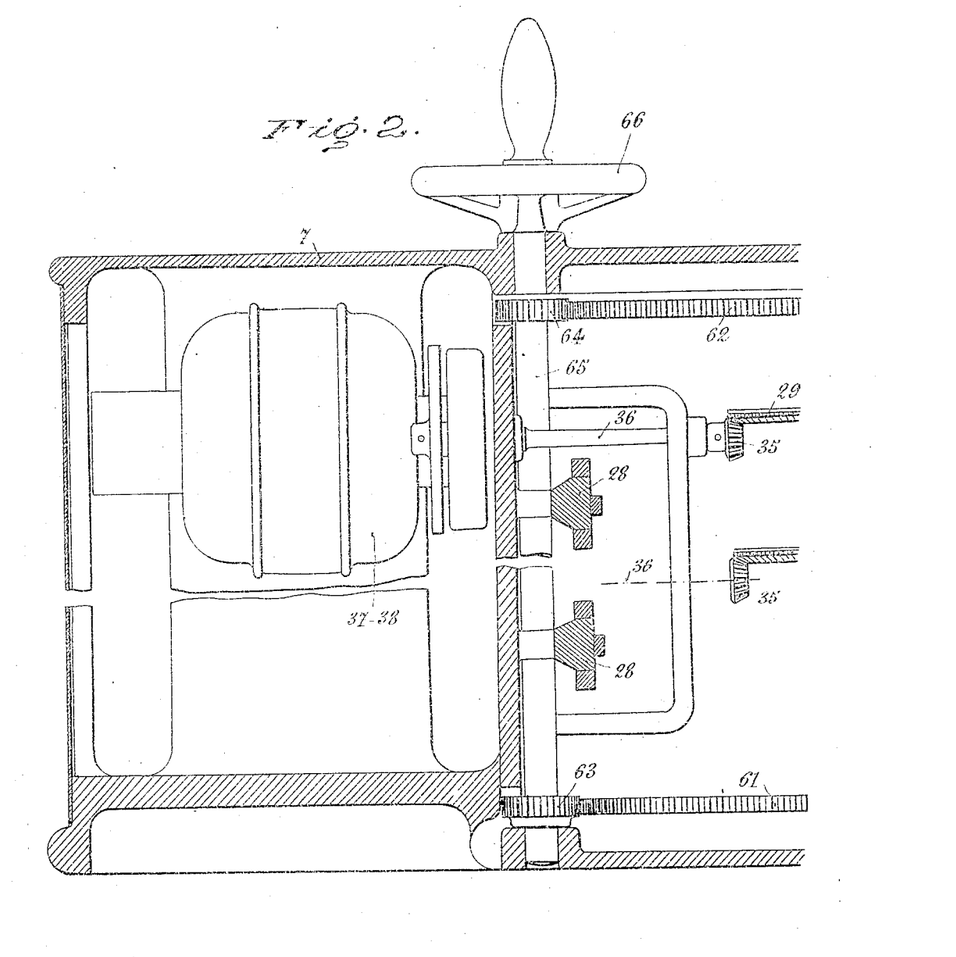
Figs. 2 and 2ª are together a sectional elevation of the transmitting and tell-tale apparatus, the installation being assumed by way of example to be applied to the control of four receiving stations; the section being interrupted and showing only two of the interrupter devices and one of the operating motors 37, 38 of the corresponding tell-tale hand 4.
Figure 2A:
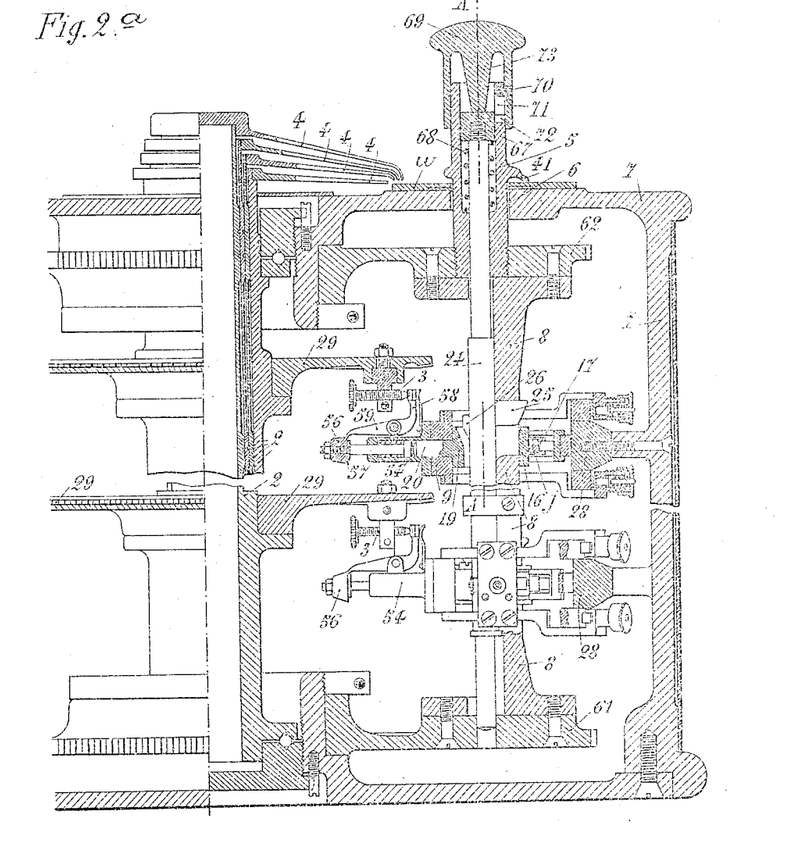

In accordance with one of the improvements which form the object of the present invention a socket 54 is fixed upon the insulating frame 9 and forms a support for a spring catch provided with an inner head 55 and an outer head 56, the inner edge of which is cut away at 57. A pawl 58—59 is pivoted to the socket 54; a spring 60 bearing upon the branch 58 constantly tends to cause the nose of the branch 59 to bear against the head 56 of the spring catch. The rod 24 (Fig. 2ª) which carries the cams 26 and the noses 25 movable in slots in the bar 8 is guided at the upper end in the socket 5 and at the lower end in a toothed disk 61 loose around the axis of the shafts 2. A widened portion at the lower end of the bar 8 is secured to this disk and a widened portion on the upper end of the bar is secured to a similar toothed disk 62 rigid with the socket 5 and loose around the axis of the shafts 2.

The toothed disks 61, 62 mesh respectively with pinions 63, 64 keyed upon a shaft 65 journaled in the frame 7 and carrying externally a hand wheel 66. The upper end of the rod 24 carries a head 67 beneath which a counter spring 68 acts; this spring bears upon the bottom of the socket 5. A pusher 69 capping the socket 5 is held upon this socket by a pin 70 guided in a right-angled groove 71, 72; by means of an internal nipple 73 this presser bears against the head 67 of the rod 24. Upon the operating sleeve of shaft 2 corresponding to each of the tell-tale hands 4 there is keyed a toothed disk 29 meshing with a pinion 35 keyed upon the shaft 36 connected with a corresponding motor 37, 38.

To each of the disks 29 there is fixed a tappet 3 the pin-shaped end of which is intended to lock in the end of the branch 58 of the pawl 58—59. With this object this end carries a head (Fig. 9) presenting a depression 75' between two inclined surfaces 74.

In a plane perpendicular to the frames 10, 11 two locking pawls 75, 76 are pivoted to the rod 24; these pawls are only able to lock is the direction of the presser 69 and a spring 77 constantly tends to keep them away from the said presser, that is to say, bearing against the rod 24. The noses of these pawls can be brought into contact with the stays o' p' of the frames 10, 11.

Figure 5:
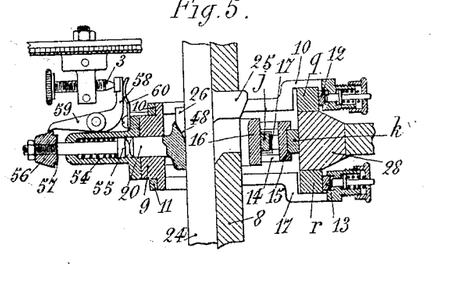
Figs. 5 and 6 show in sectional elevation and in sectional plan respectively the parts in a second operative position.
Figure 6:
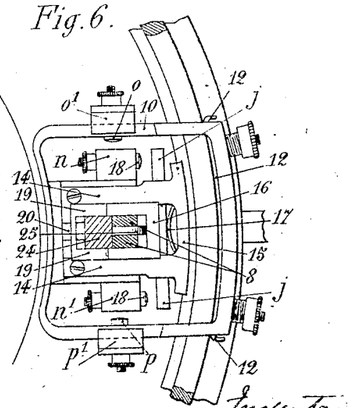
Figure 7:
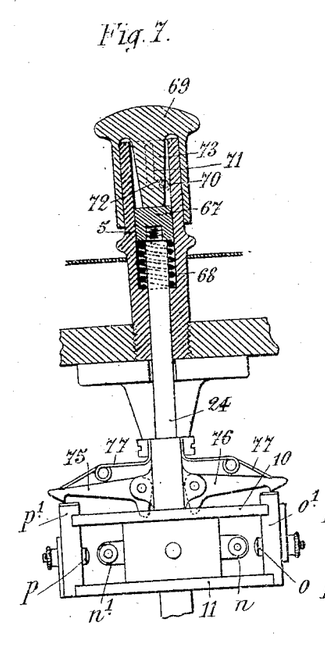
Figs. 7, 8 and 9 show respectively in sectional elevation and in plan a third position.
Figure 8:
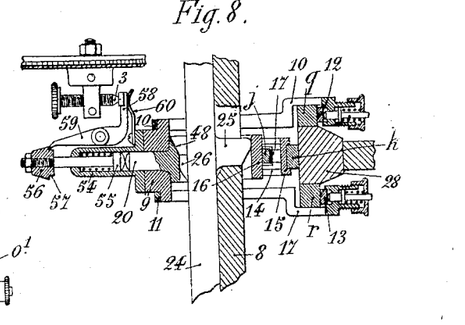
Figure 10:
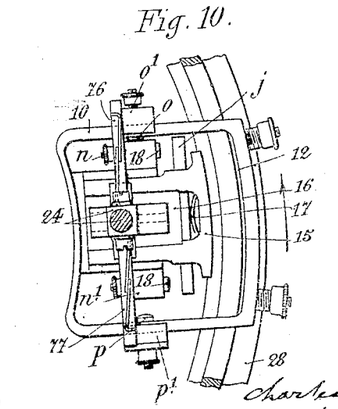
Figs. 10 and 11 show the parts in a fourth position in elevation and in sectional plan.
Figure 11:
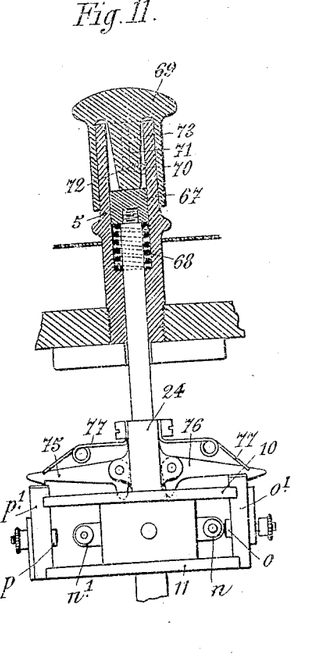

If it be desired to actuate the shafts a (Fig. 1) from a distance by means of the device described the procedure is as follows: The operator at the transmitting station first of all actuates the pusher 69 and presses in the rod 24 against the counter spring 68. By turning the pusher after it has been forced in, the retaining pin 70 is engaged in the horizontal portion 72 of the groove 71, 72 and the rod is thus retained in the pressed-in position (Figs. 7 and 8). The noses 25 engage in the corresponding insulating bracket 16 and thus the conducting bar j is held away from the contacts 18 and prevents the closing of the circuit which connects the source of current with the motor i—h; simultaneously the cams 26 act upon the inclined surface 48 and cause the tail-pieces 20 to penetrate farther into the corresponding sockets 54; the outer head 56 of the spring catch is then engaged by the branch 59 of the pawl 58 59, the nose of which engages behind the shoulder 57 (Fig. 8). As shown in Fig. 7 the two noses of the pawls 75 and 76 are in contact with the insulating stays o' p'. The operator then rotates (to the right or to the left according to the desired direction of running), the hand wheel 66 thus rotating the toothed disk 61, 62 through the shaft 65 and the pinions 63, 64; the rod 24 is thus displaced with all of the interrupters through which it passes, the socket 5 moving in the groove 6 in the frame. From the beginning of the movement in the direction indicated by the arrow (Figs. 3, 9, 10 and 11) the contacts n and o contact and this contact is maintained by the engagement of the nose of the pawl 76 with the insulating stay o' as shown in Figs. 10 and 11. The operator stops the movement of the hand wheel 66 when the hand 41 of the socket 5 has come into a position opposite the desired division on the dial w. If, owing to incorrect operation, the operator should pass beyond this division he can correct this by operating the hand wheel 66 in the opposite direction without producing any change in the direction of rotation of the motors $i$—$h$, the engagement between pawl 76 and stay $o'$ maintaining the contact pieces $o$ and $n$ in contact. When the interrupter has been brought into the exact position the motors $i$—$h$ of the receiving stations are actuated by causing the pusher 69 to rotate upon itself so as to release the pin 70 from the horizontal portion 72 of the groove and then releasing the said pusher, in view of which the pin 70 ascends under the influence of the spring 68 into the position shown in Fig. 2. The rod 24 resumes its initial position (Fig. 2$^a$); the noses 25 release the insulating bracket 16 which enables each spring 17 to cause the corresponding conducting bar $j$ to come into contact with the contact pieces 18. The circuit proceeding from the source of electricity and connected by the interrupters with the telerupters and with the motors $i$—$h$ is closed. The motors actuate the apparatus to be controlled and send current into the motors 37, 38 which are controlled by the former. The hands 4 begin to move being acted upon by the transmissions 36, 35, 29, 2. Each of the toothed wheels 29 displaces its tappet 3. When the latter encounters the arm 58 of the corresponding pawl (which has been previously moved to the desired position) the latter rocks and its branch 59 releases the head 56 of the spring catch (Fig. 5). The catch reënters the socket 54 and presses back the U-shaped part 20, 19 which in lifting the insulating bracket 16 separates the bar $j$ from the contacts 18 (Figs. 5 and 6). The circuit of the motors $i$—$h$ is then broken and the motors 37, 38 no longer receive current.

It will be seen that in the novel device described the part for driving the interrupters, that is to say, the hand wheel 66, is separate from the thrust member for actuating the rod 24, that is to say, the pusher 69. This separation presents the following advantages; the rod 24 is guided at its two ends and is not given a large angular movement directly by hand. The operator has only to exert a small effort upon the hand wheel in order to displace the rod and all the interrupters carried thereby. On the other hand when the hand wheel 66 is released a simultaneous release of the pusher 69 is not thereby entailed; the pusher can remain in the depressed position the proper pawl 75, 76 being engaged with the corresponding insulating stay $o'$ or $p'$ which as stated above, permits of rectifying any incorrect operation. The pusher 69 can then be released, that is to say, lifted for the purpose of placing the motors $i$ $h$ in circuit without the least difficulty. As the current is sent into the motors and an error in operation, such as the inadvertent passage beyond a division of the dial, is only detected at this moment, the mechanism can be stopped by depressing the pusher and rotating the hand wheel 66 in the opposite direction without danger and the error incident upon the rotation of the motors in the wrong direction corrected, seeing that the interrupter has remained in the same position relatively to the contact pieces $o$ and $p$ because the supplementary rotation of the hand wheel in the reverse direction has left the interrupter engaged in the desired position.

Figure 12:
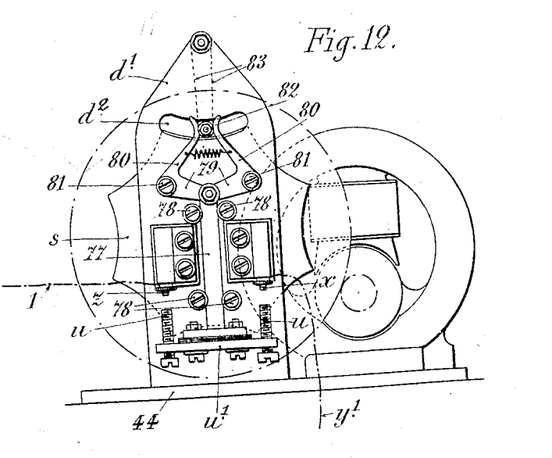
Fig. 12 is a front elevation of the device installed at the receiving station and mounted upon the shaft *d* (Fig. 1) driven by the motor *i h* of this station.
Figure 13:
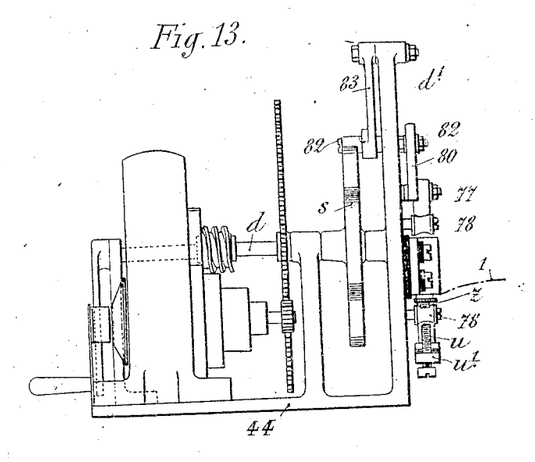
Fig. 13 is a corresponding longitudinal elevation.
Figure 14:
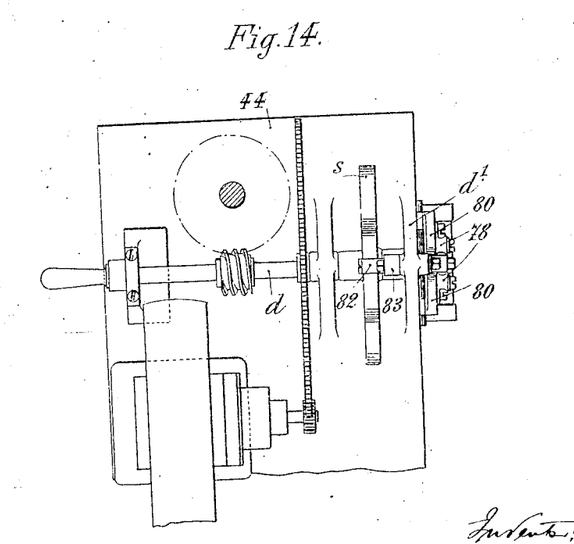
Fig. 14 is a plan.

Another improvement forming the object of the present application consists in a practical constructional form of the device for the transmission of current impulses between the motors $i$ $h$ of the receiving stations and the electromechanical escapements of the transmitting station. This novel arrangement is represented in detail in Figs. 12, 13 and 14 and indicated diagrammatically in Fig. 1. Two contact pieces $z$ and $x$ are secured to the upright $d'$ of the supporting frame 44 of the shaft $d$; these contact pieces are connected by conductors $i$ and $y'$—$y$ respectively to the electromagnet, the core 33 of which serves to attract the finger 31 of the electromechanical escapement of the motor 37—38 and with the source of current. Opposite these fixed contact pieces two contact pieces $u$ are adapted to move; they are united by a conducting bridge $u'$ which is carried by a rod 77. The latter is guided between rollers 78 journaled on the frame $d'$; at its upper end it forms a pivot for one of the branches of two bent levers 79—80 which are themselves pivoted to the frame $d'$ at 81. The branches 80 of these levers embrace one of the ends of a rod 82 passing through a slot $d^2$ in the frame $d'$ and carried by a rocking lever 83 pivoted to the said frame; the other end of the rod 82 forms a roller and constantly bears upon a disk $s$ furnished with a series of notches or recesses along an arc of a circle (Fig. 12). When the shaft $d$ rotates it carries in its movement the recessed disk $s$; this disk imparts to the lever 83 a rocking movement which is transmitted to the bent levers 80—79 and produces an alternating movement of the rod 77. In this movement the contact pieces $u$ are alternately brought into contact with the contact pieces $z$ and $x$ and separated from them. Each time contact is established a current impulse is sent into the electromagnet of the electro-mechanical escapement of the motor 37, 38. This arrangement which is essentially mechanical presents advantages in the sense that it permits of dispensing with sliding contacts, the operation of which is uncertain and also permits of indefinitely increasing the number of current impulses transmitted to the motors actuating the tell-tale hands.

As will be readily understood the arrangement of the rocking lever, actuated by the notched disk for the production of the alternating movement of the contact pieces $u$ enables the direction of rotation of the shaft $d$ to be reversed at any moment.

What I claim and desire to secure by Letters Patent of the United States is:—

1. In combination, a driven member, an indicator, a motor associated with each, an escapement associated with said indicator and a circuit-closer with said driven member, connections between said motors and between said escapement and circuit-closer, a source of current, a spring-pressed vertically movable circuit maker, contacts operable thereby, a circuit-breaking element, means moving the same to a predetermined position, a member movable with said indicator and engaging said element to open the circuit from said source of current and means for securing said circuit maker against vertical movement.

2. In combination, a driven member, an indicator, a motor associated with each, an escapement associated with said indicator and a circuit-closer with said driven member, connections between said motors and between said escapement and circuit-closer, a source of current, a vertically movable circuit-maker, contacts operable thereby, a pivoted circuit-breaking element, means moving the same to a predetermined position, and a member movable with said indicator engaging said element to open the circuit from said source of current and means for securing said circuit maker against vertical movement.

3. In combination, a driven member, an indicator, a motor associated with each, an escapement associated with said indicator and a circuit-closer with said driven member, connections between said motors and between said escapement and circuit-closer, a source of current, a conductor, a frame associated therewith, contacts carried by said frame, means for moving said frame as a whole with relation to said conductor, and independent means for moving said contacts disassociated from the means for moving said frame.

4. In combination, a driven member, an indicator, a motor associated with each, an escapement associated with said indicator and a circuit-closer with said driven member, connections between said motors and between said escapement and circuit-closer, a source of current, a conductor, a frame associated therewith, a plurality of contacts carried by said frame, means for moving said frame as a whole with relation to said conductor, independent means for moving said contacts disassociated from the means for moving said frame, and means holding two of said contacts in engagement during the movement of said frame.

5. In combination, a driven member, an indicator, a motor associated with each, an escapement associated with said indicator and a circuit-closer with said driven member, connections between said motors and between said escapement and circuit-closer, a source of current, a conductor, a frame associated therewith, a plurality of contacts carried by said frame, means for moving said frame as a whole with relation to said conductor, independent means for moving said contacts, and a pivoted element holding two of said contacts in engagement during the movement of said frame.

6. In combination, a driven member, an indicator, a motor associated with each, an escapement associated with said indicator and a circuit-closer with said driven member, connections between said motors and between said escapement and circuit-closer, a source of current, a conductor, a frame associated therewith, a plurality of contacts carried by said frame, means for moving said frame as a whole with relation to said conductor, independent means for moving said contacts, and a spring-pressed pivoted element holding two of said contacts in engagement during the movement of said frame.

7. In combination, a driven member, an indicator, a motor associated with each, an escapement associated with said indicator and a circuit-closer with said driven member, connections between said motors and between said escapement and circuit-closer, a source of current, a conductor, a frame associated therewith, contacts carried by said frame, a hand-wheel for moving said frame as a whole, connections between said hand-wheel and frame, and independent means for moving said contacts.

8. In combination, a driven member, an indicator, a motor associated with each, an escapement associated with said indicator and a circuit-closer with said driven member, connections between said motors and between said escapement and circuit-closer, a source of current, a conductor, a frame associated therewith, contacts carried by said frame, a hand-wheel for moving said frame as a whole, gear connections between said hand-wheel and frame, and independent means for moving said contacts.

9. In combination, a driven member, an indicator, a motor associated with each, an escapement associated with said indicator and a circuit-closer with said driven member, connections between said motors and between said escapement and circuit-closer, a source of current, a vertically movable circuit-maker, means for holding said circuit-maker in its depressed position, a circuit-breaking element, means moving said element to a predetermined position, and a member movable with said indicator and engaging said element to open the circuit from said source of current.

10. In combination, a driven member, an indicator, a motor associated with each, an escapement associated with said indicator and a circuit-closer with said driven member, connections between said motors and between said escapement and circuit-closer, a source of current, a conductor, a frame associated therewith, a pivoted circuit-breaking element mounted on said frame, means for moving said frame to a predetermined position, and a member movable with said indicator and engaging said element to open the circuit.

11. In combination, a driven member, an indicator, a motor associated with each, an escapement associated with said indicator and a circuit-closer with said driven member, connections between said motors and between said escapement and circuit-closer, a source of current, a conductor, a horizontally rotating carriage, a frame mounted on said carriage and associated with said conductor, a pivoted circuit-breaking element mounted on said frame, means for rotating said carriage to move said element to a predetermined position, and a member movable with said indicator and engaging said element to open the circuit.

12. In combination, a driven member, an indicator, a motor associated with each, an escapement associated with said indicator and a circuit-closer with said driven member, connections between said motors and between said escapement and circuit-closer, a source of current, a conductor, a frame associated therewith, contacts carried thereby for engagement with said conductor, a spring-pressed rod vertically displaceable to complete the circuit from said source of current through said contacts and means for securing said rod against vertical movement.

13. In combination, a driven member, an indicator, a motor associated with each, an escapement associated with said indicator and a circuit-closer with said driven member, connections between said motors and between said escapement and circuit-closer, a source of current, a conductor, a horizontally rotating carriage, a frame mounted on said carriage and associated with said conductor, contacts carried by said frame for engagement with said conductor, a spring-pressed rod carried by said carriage and vertically displaceable to complete the circuit from said source of current through said contacts and means for securing said rod against vertical movement.

14. In combination, a driven member, an indicator, a motor associated with each and connections between said motors, an electromagnetic escapement associated with said indicator, and means for closing the circuit through said electromagnet through a circuit-closer associated with said driven member comprising a movable member provided with cam surfaces, a lever adapted to be rocked thereby, and contacts moving simultaneously with said lever to make and break said circuit.

15. In combination, a driven member, an indicator, a motor associated with each and connections between said motors, an electromagnetic escapement associated with said indicator, and means for closing the circuit through said electromagnet through a circuit-closer associated with said driven member comprising a rotating member provided with cam surfaces and driven by the driven-member motor, a lever adapted to be rocked thereby, and contacts operated by said lever to make and break said circuit.

16. In combination, a driven member, an indicator, a motor associated with each and connections between said motors, an electromagnetic escapement associated with said indicator, and means for closing the circuit through said electromagnet through a circuit-closer associated with said driven member comprising a rotating member provided with cam surfaces and driven by the driven-member motor, a lever adapted to be rocked thereby, a rod moved by said lever, and contacts carried by said rod and operating to make and break said circuit.

In testimony whereof I have affixed my signature in presence of two witnesses.

CHARLES GEORGES LOHAY.

Witnesses:
 EUGÉNE BARBE,
 VICTOR BUNET.